INVENTORS
WINSTON PALMER
ROSCOE S. ROBBINS
BY JAMES NEWELL

Daniel P. Worth
ATTORNEYS

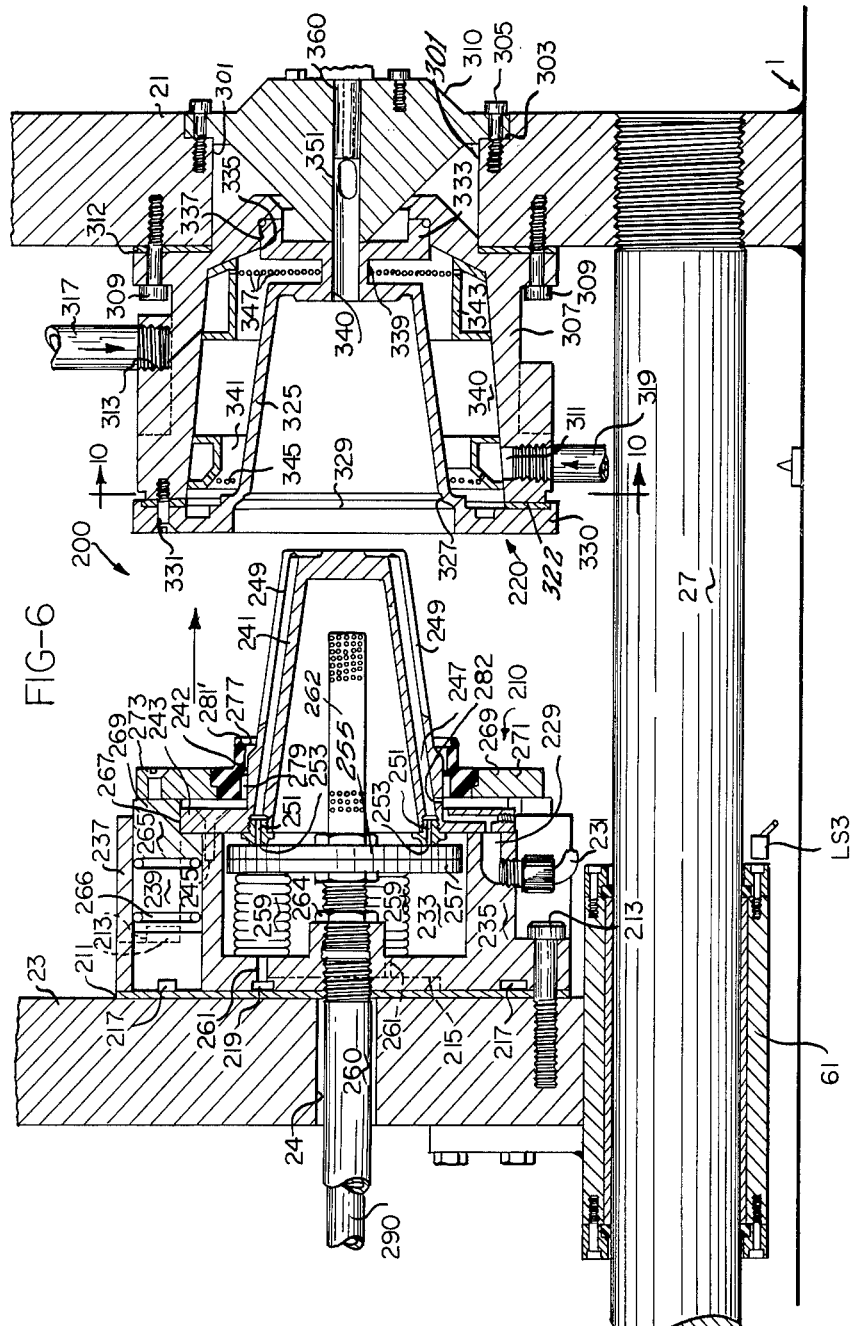

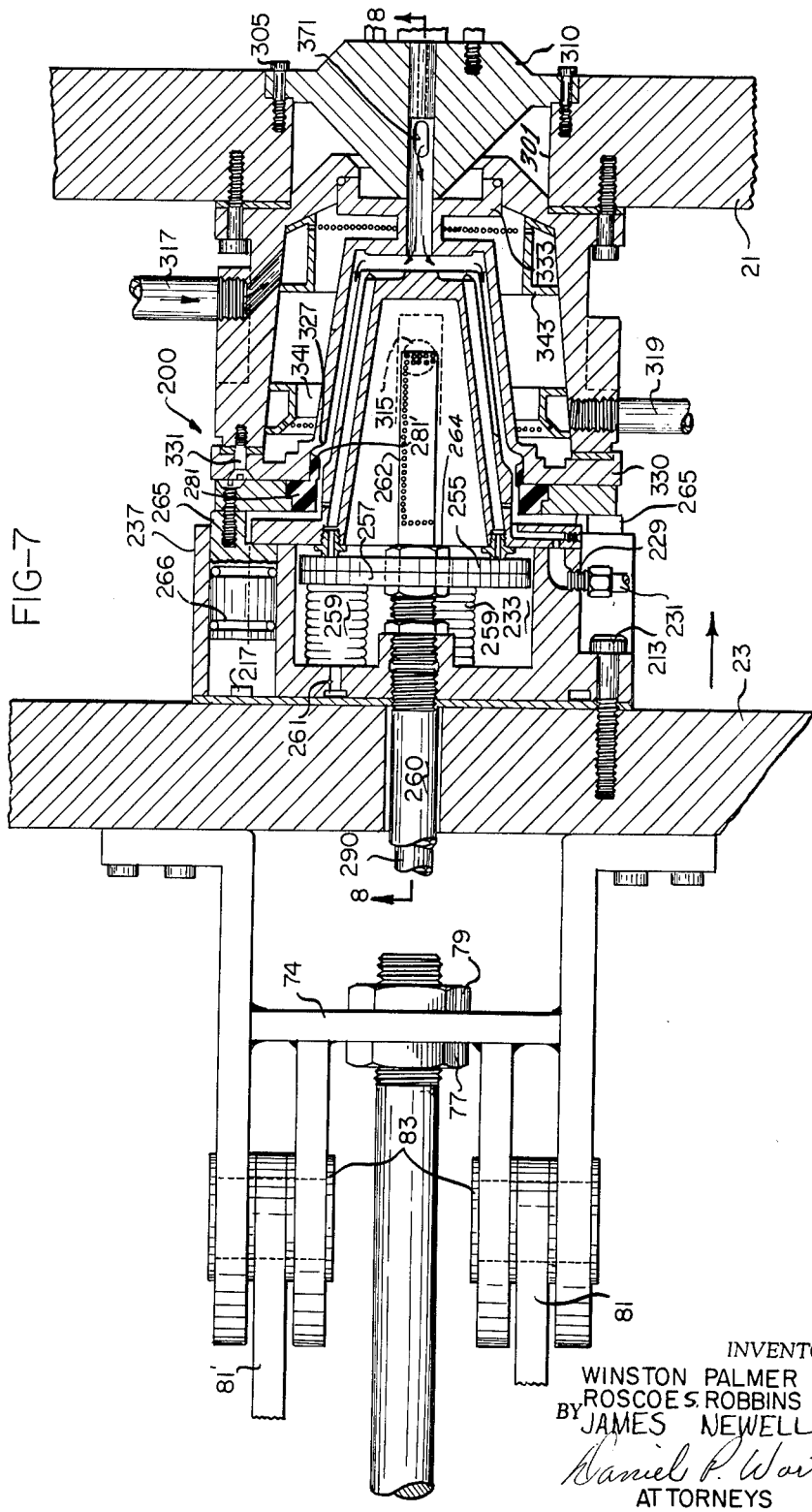

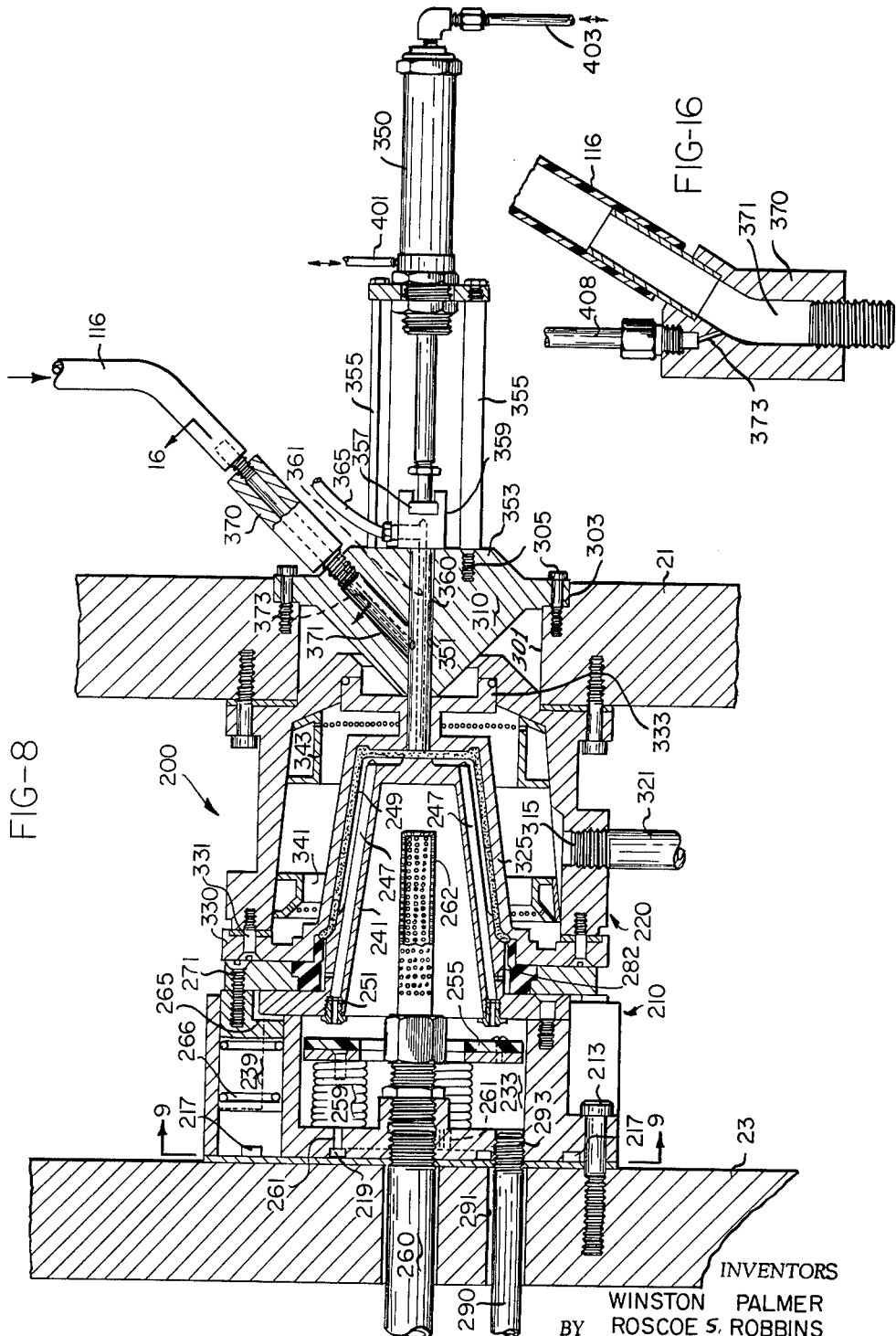

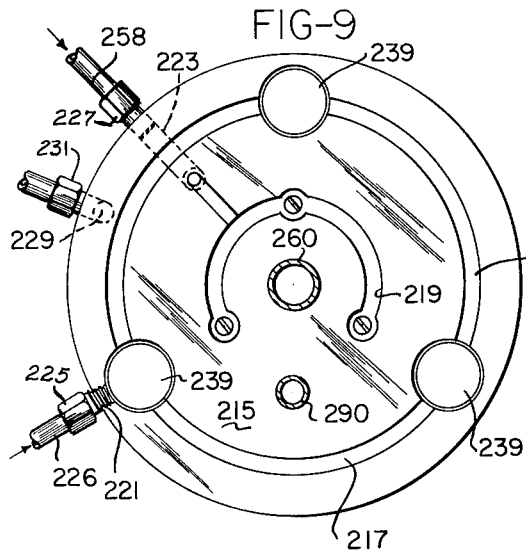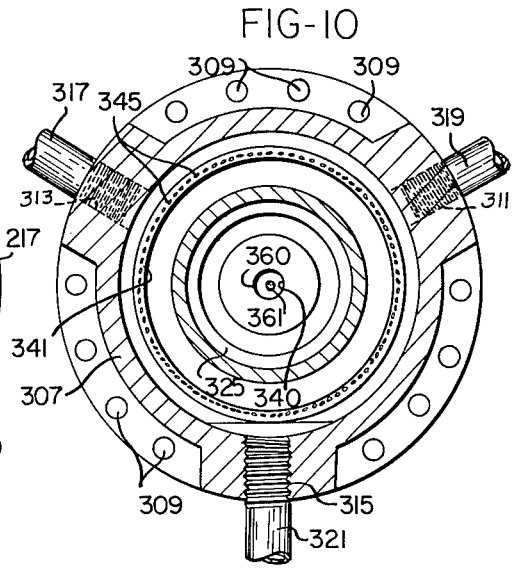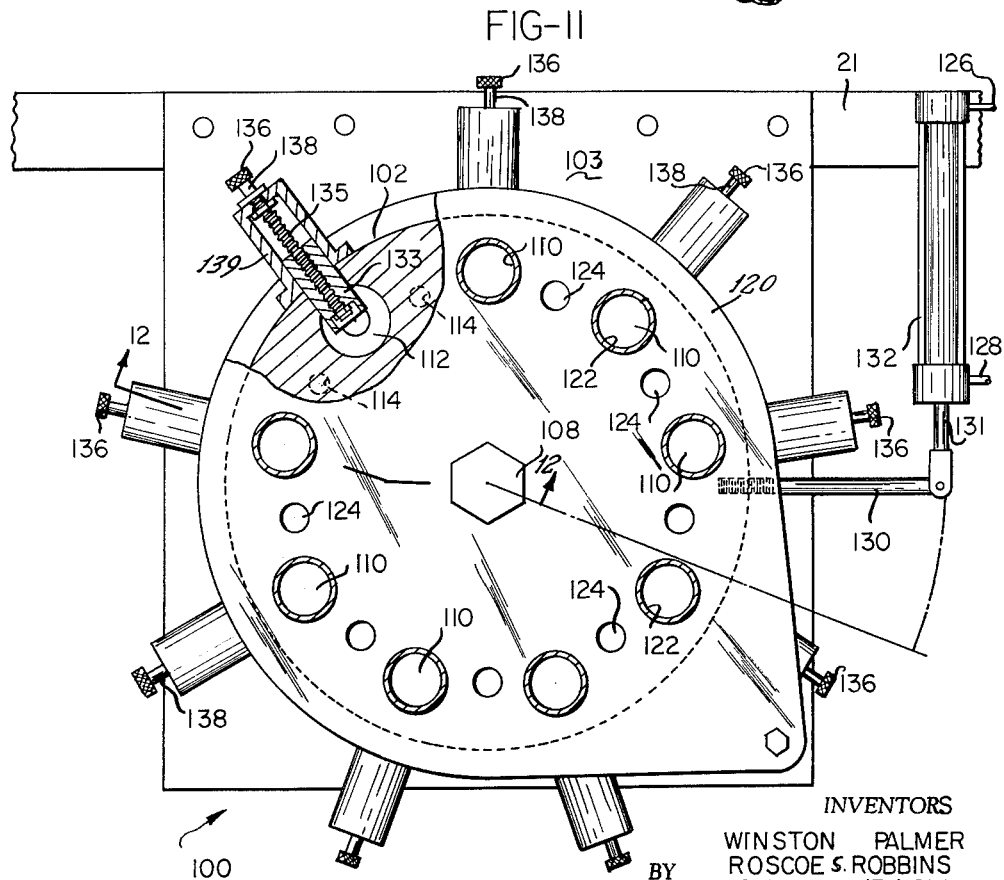

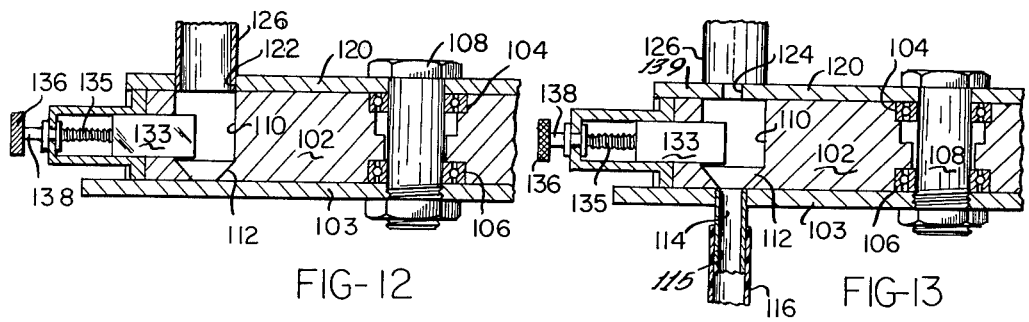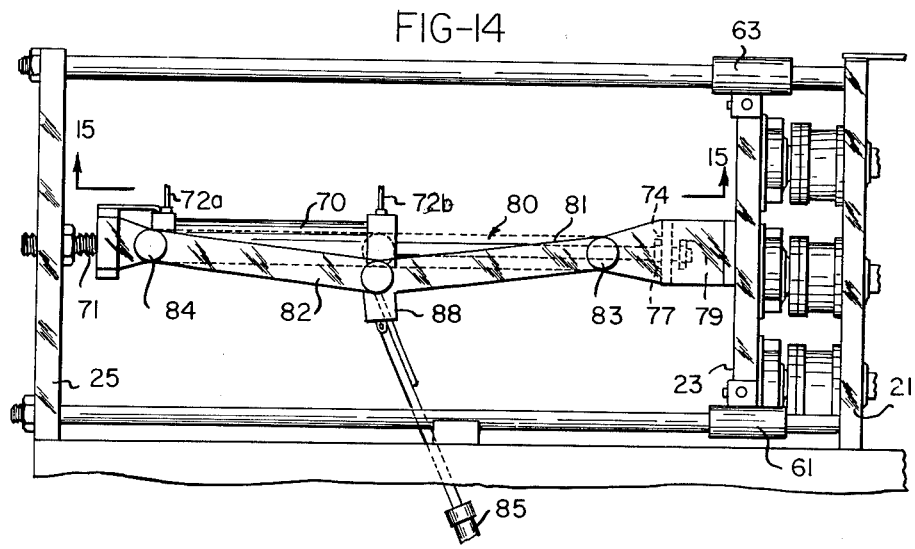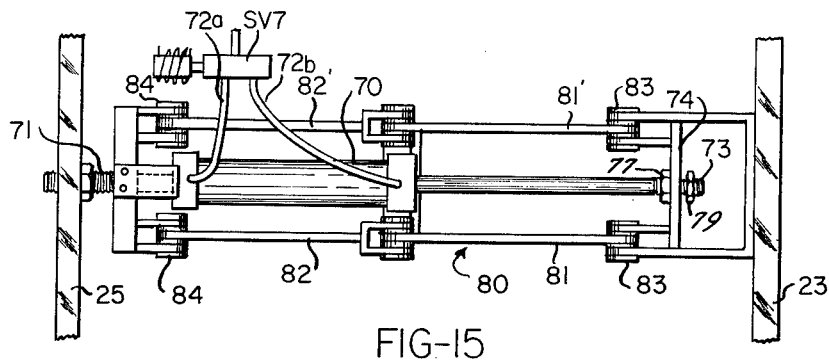

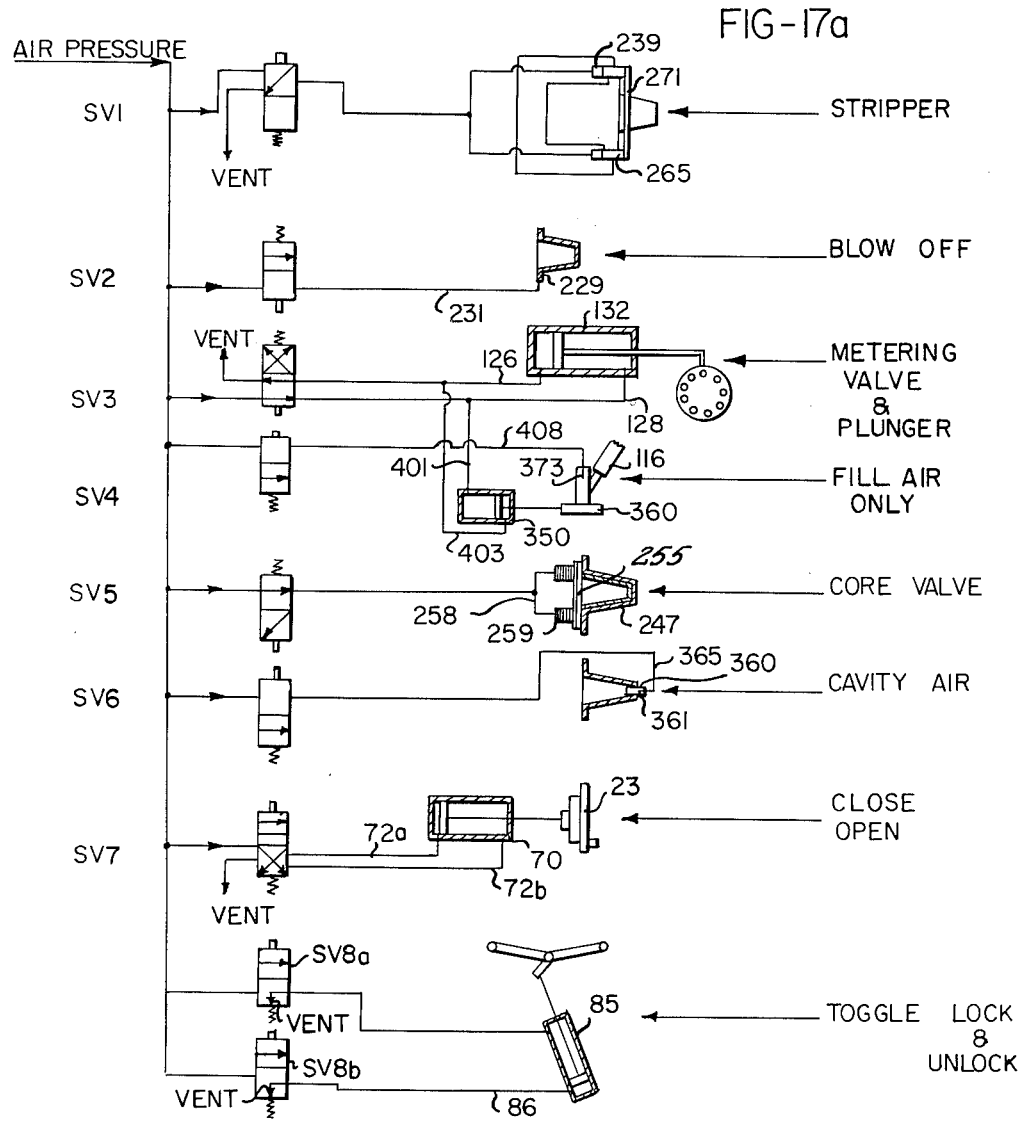
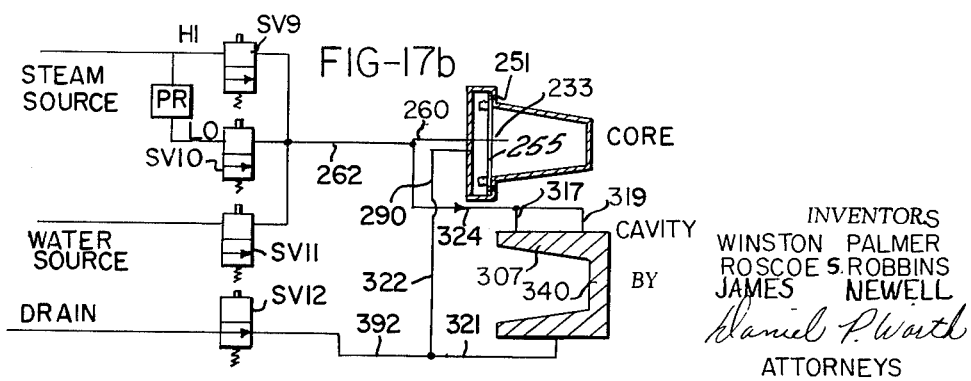

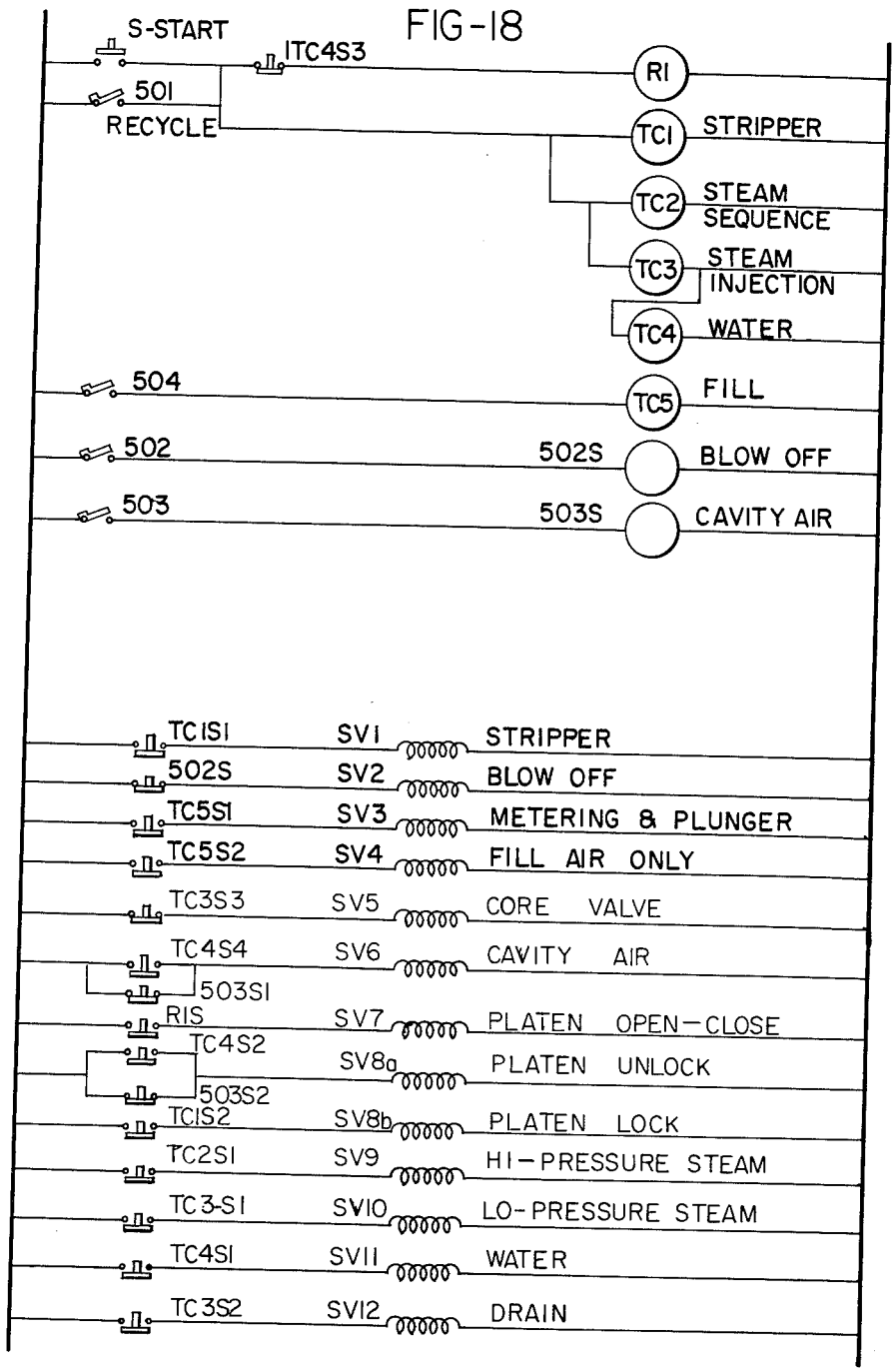

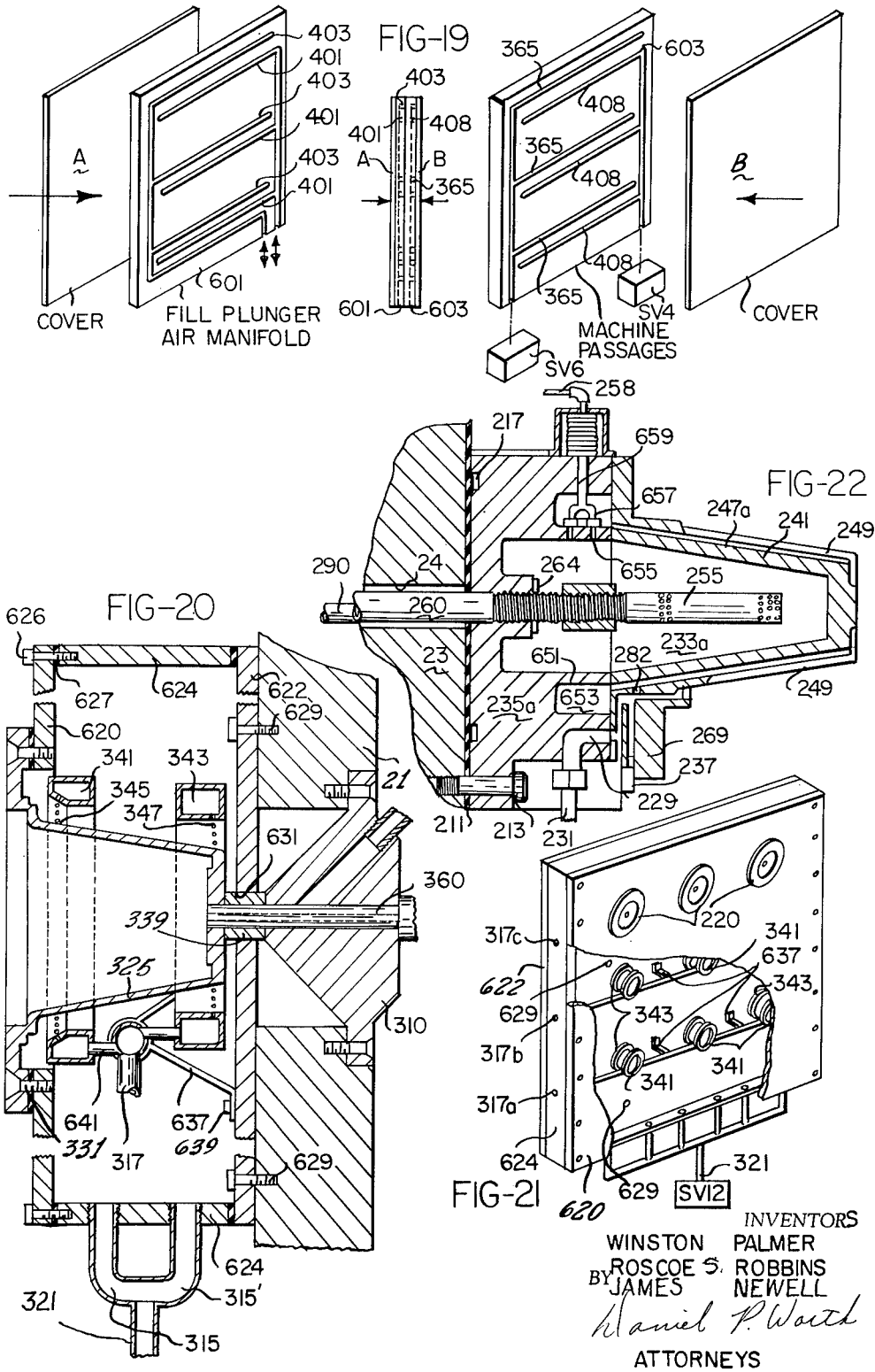

United States Patent Office 3,224,037
Patented Dec. 21, 1965

3,224,037
APPARATUS FOR MOLDING FOAMABLE THERMOPLASTIC PARTICULATE MATERIAL
Roscoe S. Robbins, Fort Worth, Tex., Winston T. Palmer, Glendora, Calif., and James F. Newell, Jr., Wanamassa, N.J., assignors, by mesne assignments, to Crown Machine & Tool Co., Arlington, Tex., a corporation of Texas
Filed Feb. 1, 1963, Ser. No. 255,554
19 Claims. (Cl. 18—5)

This invention is concerned with molding apparatus. In particular the invention relates to a molding machine for expandable plastic wherein small pellets or beads are expanded by an absorbed expansion agent gasified under the influence of heat and pressure to form self-sustaining articles.

For the purposes of illustrating this present invention, the following disclosure and discussion will be related to the manufacture of cup-like articles from expandable polystyrene beads though it will be appreciated that the operating principles may be readily applicable to other expandable bead or pellet-like raw materials and the manufacture of a great variety of products other than cups or containers, such as dairy product packages, shipping packages, figurines, toys and the like.

It is well known that polystyrene pellets or beads can be infused during manufacture with an expansion agent, usually petroleum based hydrocarbon, which will be absorbed into the beads and held during normal temperature conditions. When such beads are exposed to increases in temperature, particularly to the softening range of the plastic material, the expansion agent will cause the beads to swell as much as ten to twenty times their original size yet still, if properly exposed to the heat, retain their closed cell bead-like structure. Thus if such a material is enclosed in a mold and caused to expand, the beads will swell and unite to form an integral body having a configuration corresponding to that of the mold. If proper control of temperature conditions is exercised, the combination of pressure and temperature will produce an article having a closed cellular structure wherein each cell or bead is intimately fused with each other bead or cell and a smooth surface can be formed on the object. By this technique, liquid impermeable, insulated articles of a variety of configurations may be formed.

Various means can be utilized to heat the molds; filling the molds prior to heating; and, also, releasing the molded objects from the mold parts. For example, simple hand filling, followed by steam heating of the mold parts and subsequent cold water dipping of the completed object and mold parts is a most elementary procedure which can be used. Contrasted to this simple procedure are the more sophisticated automatic machines which perform the same functions but on a cyclical basis under timer or temperature control. It is into the latter category that the present invention is classed.

Despite the definite insulative and sanitary advantages imparted to objects such as a container, in particular a cup, when manufactured from expandable styrene beads, market acceptance of such products is based in large measure on cost of these items. This fact is inescapable when it is realized that such products compete in the market place against such similar items formed from paper, extruded or injection molded plastics such as high-impact styrene and such similar raw materials. The cost factor is even more significant where the product is designed primarily as a disposable item, i.e., a single service food or beverage container.

While machines have been developed for the automatic molding of such items, nonetheless, products so molded have not made the impact in the market place as would be anticipated. This lack of impact is attributable to a wide fluctuation in quality, from poor to good, coupled with the inability of some present machines to porduce such articles as disposable cups at a cost and, hence, price to the consumer, comparable with competitive products.

The present invention, therefore, is directed to automatic molding apparatus capable of manufacturing, on a day-after-day basis, molded polystyrene articles of consistent good quality and at a cost which enables such products, particularly disposable products, to compete with similar products manufactured from other materials. These, then, are the primary objects of the invention.

Other objectives of importance are to produce articles in particular, among others, containers of uniformly controlled density, increased flexibility and having a moisture-resistant structure to obviate complaints concerning brittleness, "leakers," poor appearance, etc., all of which detract from the market appeal of the products.

Broadly speaking, the invention may be defined as an automatic molding press for forming self-sustaining articles from expandable particulate thermoplastic granules comprising a plurality of complementary mold parts mounted for movement, one relative to the other, on a suitable base, means for moving one of said plurality of mold parts to an intermediate closed position relative to the other of said plurality of mold parts; means for metering and filling the slightly enlarged mold cavity defined between the mold parts; means for moving the complementary mold parts to a final closed position; means for alternatively heating the mold parts while injecting steam into the molding cavity associated with each of said sets of mold parts; means for thereafter cooling the mold parts; and control means for cycling said apparatus through a closing, filling, heating, cooling and ejection cycle.

Having described in broad terms the objects and means for accomplishing the objects of the invention, a more detailed and complete understanding of the apparatus may be obtained by reference to the following detailed description, reference being made to the drawings appended hereto, wherein:

FIG. 6 is an enlarged plan, sectional view of the mold parts taken along the line 6—6 of FIG. 1 and with these parts separated.

FIG. 7 is a view similar to FIG. 6, but showing the mold parts at an intermediate, mold loading position.

FIG. 8 is an elevational sectional view taken along the line 8—8 of FIG. 7 but showing the mold parts in final, closed, molding position.

FIG. 9 is a sectional view of a steam chest for the male mold taken along the line 9—9 of FIG. 8.

FIG. 10 is a view similar to FIG. 9, but showing the female mold arrangement and taken along the line 10—10 of FIG. 6.

FIG. 11 is a top plan view, partially in section and slightly enlarged, of a metering device used in the mold loading mechanism, taken along the line 11—11 of FIG. 1.

FIGS. 12 and 13 are elevational sectional views of the metering device shown in FIG. 11 and taken along the line 12—12 thereof showing the two extreme open and closed positions thereof.

FIG. 14 is an enlarged side elevational view of the platen closing mechanism.

FIG. 15 is a top plan view of the apparatus shown in FIG. 1 and FIG. 14 and for reference purposes is an enlarged view taken along the line 14—14 of FIG. 1.

FIG. 16 is a sectional view through the material injector taken along the line 16—16 of FIG. 8.

FIG. 17a is a schematic parts diagram illustrating the control system for the apparatus, in particular the valving thereof.

FIG. 17b is a schematic diagram similar to 17a, but showing steam, water and drain valves.

FIG. 18 is a ladder diagram showing one example of a control circuit.

FIG. 19 is a schematic view of a modified form of piping structure.

FIG. 20 is a sectional view of one modification of the female mold structure, the view being similar to FIG. 6.

FIG. 21 is a perspective view of a group of modified female mold parts arranged according to the structure of FIG. 20.

FIG. 22 is a view similar to FIG. 6, and showing a modified valve arrangement as incorporated in the male mold assembly.

Figure 1:
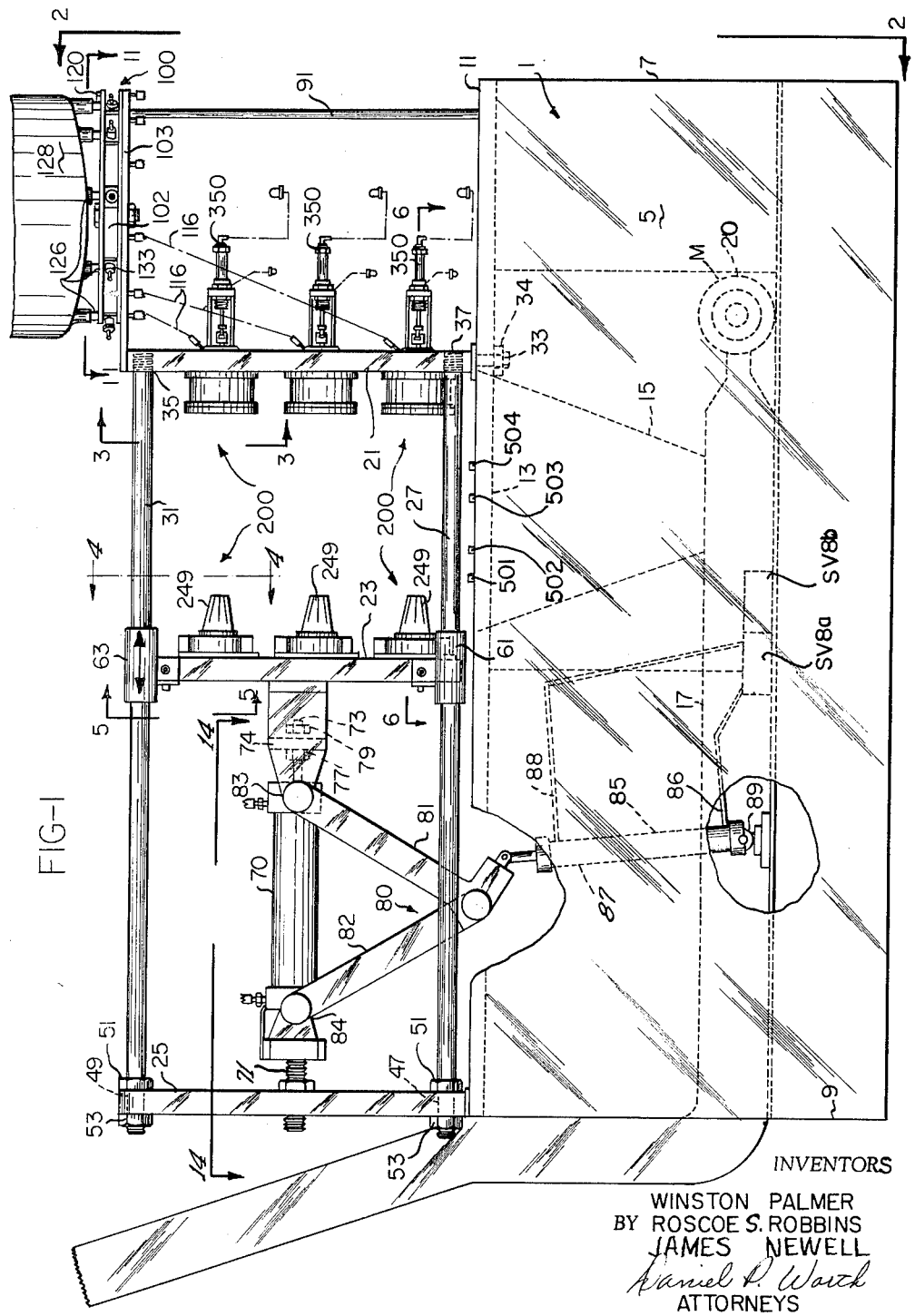
FIG. 1 is a side elevational view of the machine with the mold parts fully open.

Turning initially to FIG. 1, it will be noted that, for the purposes of clarity, certain of the various ducts, pipes, etc., are merely illustrated schematically and will be described in detail hereinafter. It is clear, however, that the functioning parts of the apparatus are mounted on a rectangular box-like base 1. Base 1 is thus comprised of a pair of elongated vertical sides 3 and 5 and vertical end panels 7 and 9 and a generally horizontal flat top area 11. The central portion 13 of top area 11 is open as is the central portion of side 3, all illustrated by the dotted lines of FIG. 1. Within the open portion 13 of the top 11 of base 1 may be positioned a funnel-shaped collector 15 which, in turn, is in communication with a duct 17 or other conveying means shown in dotted lines 5. The duct 17, if such a conveying means is used, is in turn connected to a blower 20 powered by an electric motor M mounted as shown in FIG. 1 in the interior of base 1.

Mounted on the top area 11 of base 1 are three vertically disposed plates 21, 23 and 25. The plates 21 and 23, generally square in elevation, define mold carrying platens and will be so identified hereinafter. Plate 25, which is triangular in vertical elevation, defines simply a support for a plurality of slide bars, three in number (only two being shown) 27, 31, respectively, which in turn support and guide platen 23 which is horizontally movable with respect to platen 21.

It will be seen that platen 21 is fixed to the base 1 by anchor bolts 33 (only one shown) provided at each lower corner thereof and projecting downwardly through the top area of the base 1. Suitable nuts 34 serve to firmly clamp the platen 21 in its vertical position. The platen 21 is, in turn, provided with three, triangularly oriented, threaded apertures 35, 37 (only two illustrated). The orientation of these apertures is such that two are disposed adjacent the two lower corners of the fixed platen 21, while the third is centered between the two top corners closely adjacent the top edge of the platen. In other words, the apertures 35, 37 are equidistant one from the other and lie at the corners of an equilateral triangle symmetrically superimposed against platen 21. Since these apertures are threaded internally, each can receive the threaded end of each of three slide bars or rods 27, 31 which extend horizontally therefrom to the support plate 25. These rods define in a horizontal plane the corners of an equilateral triangle, and are fixed to the respective corners of the triangular plate 25 which in turn has one side merely resting on the top of base 1. One manner of fixing plate 25 to the guide bars 27, 31 is by threading a short portion of the ends thereof. The threaded portion then passes through suitable bores 47, 49 in plate 25 with suitable nuts 51, 53 engaging the opposite sides of the plate 25 to rigidly lock these parts together. Thus the vertical plate 21, slide rods 27, 31 and support plate 25 form a unitary stationary structure on the top of base 1.

Also as clearly shown in FIGS. 1 and 6, the movable platen 23 is provided at its two lower corners and adjacent the midpoint of its top edge with three slides 61, 63 (only two illustrated) which engage and slide upon the slide bars 27, 31, respectively. The guides are, in effect, lubricated collars surrounding each slide bar. Since they are fixedly attached to the movable platen 23, it is obvious that this platen can be and is held in a true vertical position parallel to platen 21 but is horizontally movable with respect thereto.

Suitable means is provided for the purpose of moving the platen 23 on the slide bars 27, 31. As shown clearly in FIGS. 1, 14 and 15, this means comprises first a directly connected, double acting pneumatic motor 70 having its barrel end mounted on support plate 25 at 71. The rod end of motor 70 is connected to the back of movable platen 23. The terminal end of the rod is threaded at 73. This threaded end 73 is passed through a saddle plate 74, spaced from, but fixed to, the back of movable platen 23 such that the threaded end 73 passes therethrough and receives nuts 77, 79 at least one of which, namely nut 77, should at all times be firmly in abutment with saddle plate 74. Nut 79 may or may not be drawn tight against the saddle plate depending on certain factors, as will be discussed immediately hereafter.

In addition to the motor 70 and also extending between support plate 25 and movable platen 23 is a toggle locking mechanism 80 which acts to effect final locking of the movable platen 23 relative to platen 21. This mechanism comprises a pair of links 81, 81' pivotally connected to the back of movable platen 23 at 83 and to a further pair of links 82, 82' in turn pivotally connected to support plate 25 at journal 84. The toggle links 81, 81' are provided with an extension 88 (only one shown) to which is pivotally connected the rod end of a further pneumatic motor 85. The barrel or cylinder end 87 of motor 85 is pivotally connected via a conventional journal connector to the base 1 at 89. Thus, as the motor 85 is energized it will cause toggle links 81, 81' and 82, 82' to move from a "broken" position as shown in FIG. 14 to a straight-line, fully locked position, as illustrated by the dotted lines, with platen 23 at its closed position with respect to stationary platen 21. Due to the spacing between nut 79 and saddle 74, the movement of platen 23 can be accomplished by the toggle mechanism despite the fact that motor 70 may be fully extended.

Another mode of effecting the partial and final closing of the platen 23 is based on the adjustment of nuts 77 and 79 against saddle plate 74 such that motor 70 is not quite fully extended when the platen 23 reaches its intermediate position. At this point, an extended member on one of the mold parts, to be described, will abut against the mold parts mounted on stationary platen 21. The extended element is held in extended position by a plurality of air cylinders having a combined piston area greater than the piston area of motor 70 and, hence, this motor is "stalled" at the point where the mold parts abut one another. Subsequently, the action of the toggle mechanism, coupled with a reduction in pressure within the smaller motors will force the platen 23 to its finally closed position as, and for the purposes, as will be apparent hereafter. While this latter arrangement is preferred, nonetheless, the former system, i.e., use of lost motion between the saddle 74 and nuts 77, 79, may find utility where the extended mold member is dispensed with or where, because of the size of the cylinder 70, the extended mold parts and the pistons which extend same are unbalanced in area so that the motor 70 can completely close the platen 23.

Again referring to FIG. 1, FIG. 11 and, in particular, to FIGS. 12 and 13 in conjunction therewith, it will be seen that permanently affixed to the top edge of stationary platen 21 and also supported on a vertical brace 91 is a metering valve assembly 100 forming a part of the overall bead feeding system for the molding operation. This metering mechanism 100 is, in essence, a rotary valve of cylindrical form. The valve 100 is comprised of a rotatable metering cylinder 102 mounted between a discharge plate 103 and a filler plate 120 via a pair of thrust bearings 104, 106 and a spindle 108. The metering cylinder 102 is provided with a series of equally spaced chambers, referred to as metering cups, 110. These metering cups, as seen in FIGS. 12 and 13, are provided with a cone-shaped bottom 112 which is so dimensioned as to register with an equal number of similarly spaced discharge ports 114 provided in discharge plate 103. These ports 114 are provided with short downwardly depending nipples 115, FIGS. 12 and 13, to which are connected filling tubes 116 by any suitable and conventional clamping means not shown.

The top of the metering cylinder is closed by filler plate 120 which also is provided with a series of apertures 122, 124. These apertures, as will be apparent from an inspection of FIG. 11, are of a diameter and are so spaced, relative to one another, as to be registrable with the metering cups 110 as will be more apparent as the description proceeds. The apertures 122 hereinafter referred to as filling ports, are of a diameter equal to that of metering cups 110 while the apertures 124, hereinafter referred to as filling vents, are of smaller diameter. It will be noted that the two series, i.e., filling vents 124 and filling ports 122, are interdigitated in a regular pattern in filler plate 103. The filler ports 122 are in turn connected by a series of correspondingly arranged nozzles 126 to a supply hopper 128.

Since metering cylinder 102 is rotatably mounted between discharge plate 103 and filler plate 120, it is obvious that, if the vents 124 in the former are positioned so as to be aligned with discharge ports 114 in the latter, as in fact they are, and the metering cylinder is rotated to a position such that metering cups 110 align with these apertures, any material which is contained in the metering cups 110 will be discharged through ports 114 and will pass into filler tubes 116. Simultaneously, blank, i.e., solid portions of the metering cylinder 102 will be positioned in alignment with filler ports 122. Hence, hopper 128 is such that the flow of material from the hopper into the metering cylinder 102, and specifically metering cups 110, will be cut off.

On the other hand, if the metering cylinder 102 is rotated to a position as shown in FIG. 12, the metering cups 110 will be brought into alignment with the large filler ports 124 in filler plate 120 and material in hopper 128 may discharge by gravity through nozzles 126 into the metering cups 110. If, then, the filler ports 122 are spaced at an established degree of arc, in this case about 20°, away from discharge ports 114 and associated vent ports 124, it may be seen that as the metering cylinder 102 is rocked back and forth between the two specified positions, metered charges of the bead or particulate material may be removed from hopper 128 and discharged into filler tubes 116. Obviously, the number of discharge ports 114, metering cups 110, filler ports 122, vents 124 and filler tubes is matched to the number of mold pieces or units being operated such that each of these is adequately charged during the operating cycle of the apparatus.

To effect proper back and forth rotation of metering cylinder 102, there is provided thereon a radially extending arm 130, threadedly or otherwise fixed thereto. The terminal end of this arm is in turn connected to the rod end 131 of a double acting fluid motor, for example, an air motor, 132 having a stroke of sufficient length to move the metering cylinder 112 to the two positions described.

Also, of interest, is the fact that metering cups 110 are provided with means wherein the volume embraced by each cup may be varied to suit the conditions and requirements existing in any given mold unit. Thus, as may be seen clearly in FIGS. 11, 12 and 13, the sides of the metering cups 110 are radially bored to receive therein a series of movable metering plungers 133. These plungers 133 extend into the cups 110 and also are apertured to receive threaded adjustment screws 135 provided with exteriorly disposed knurled heads 136. These adjustment screws are in turn mounted for rotation, but against axial movement, by any conventional means such as pins, collars, split rings 138 on generally U-shaped brackets 139, fixed to the side wall of metering cylinder 102. Thus, as the adjustment screws 135 are turned by means of knurled heads 136, the plungers 133 may be moved into or out of metering cups 110 so as to increase or decrease the volume of material which each can receive from hopper 128 and meter into filler tubes 116.

Having up to this point described the overall machine arrangement, the platen-closing mechanism and the material supply and metering system, specific consideration will now be given to the mold assemblies carried by stationary platen 21 and movable platen 23. Therefore, specific attention is directed to FIGS. 6, 7 and 8, it being understood that these figures of the drawings are directed to a single mold set 200 and that each mold set 200 shown in FIGS. 1, 4 and 5 may be a duplicate of that to be described.

In FIG. 6, the mold set 200 is shown in the condition wherein a molding cycle has just been completed; the products discharged; and platen 23 is beginning its cyclic movement, as shown by the arrow, by actuation of fluid motor 70, toward platen 21. As is apparent, the mold unit 200 is comprised of two elements, a core structure 210 and a cavity structure 220, the core structure 210 being carried by movable platen 23 and the cavity structure 220 being supported in corresponding cooperative position on fixed platen 21.

Figure 3:
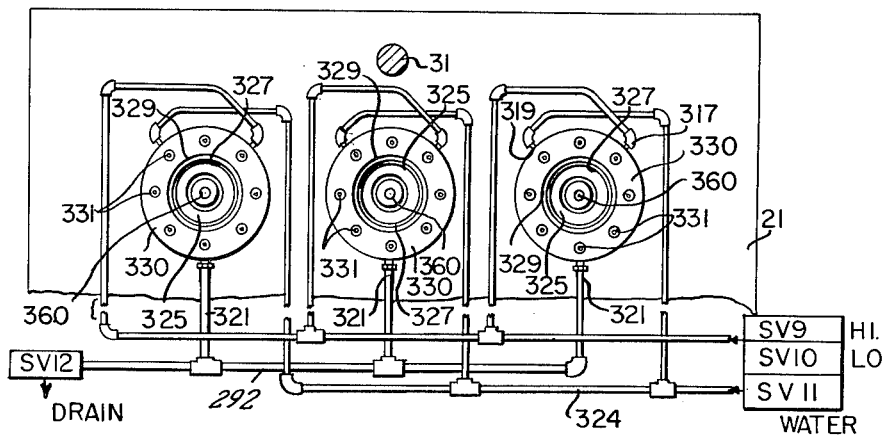
FIG. 3 is a front elevational view of the stationary platen and the female mold parts taken along the line 3—3 of FIG. 1.

As illustrated clearly in FIGS. 3, 6 and 9, the core structure 210 is built up of several components suitably fixed together, the first of which comprises a generally circular gasket 211 which abuts against the planar face of platen 23. Preferably the gasket 211 is formed from a chemically inert material such as Du Pont's "Teflon." Abutting against the gasket 211 and fixed in place by bolts 213 is a base 215 hereinafter referred to as the core chest.

As seen in FIG. 9 along with FIG. 8, the bottom of the core chest 215 is of circular form and provided with a series of annular passages 217 and 219 which are in communication with a pair of ports 221 and 223 in turn provided with nipples 225, 227 extending outwardly from the core chest 215. These nipples 225, 227 are in communication with an external source of air pressure as will be described hereinafter.

Also in connection with FIGS. 6 and 9, a further port 229 is provided in the body of core chest 215. This port, via a conventional pipe coupling 231, is also in communication with a source of air pressure as will be subsequently apparent.

Figure 4:
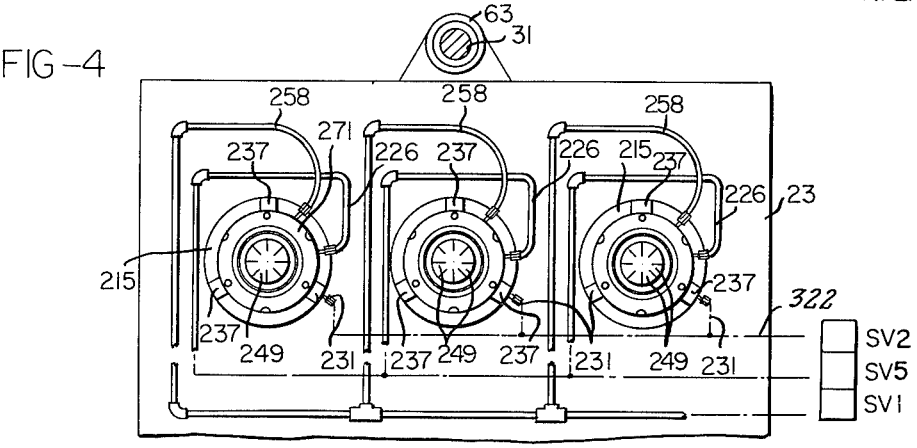
FIG. 4 is a front elevational view of the movable platen and the mold parts taken along the line 4—4 of FIG. 1.

Returning to FIG. 6, it will be seen, in association with FIG. 4, that the core chest 215 defines a hollow chamber 233 having an annular or cylindrical outer wall 235. The wall 235 in turn is interrupted at equally spaced distances by three outwardly extended ears 237 which in turn are bored out to define three cylinders 239. It will be noted that these cylinders 239 are completely closed off from chamber 233, though integrally formed therewith as a part of core chest 215. These cylinders 239 are all in communication with the aforementioned arcuate passage 217 which is provided in the platen-side face of the core chest 215. Obviously, then, as the core chest is bolted firmly in place on platen 23, with the gasket in place, the annular part 217 becomes a closed conduit leading from port 221 into the cylinders 239.

The chamber 233 is generally cup-shaped, i.e., open at one end, and is effectively formed into a closed chamber by the core body 241 of the mold core unit 210. The core body 241, of course, may assume many configurations depending on the configuration of the article being molded. In this case, since the apparatus is to be applied to the manufacture of cups, the core body 241 is in the form of a frusto-conical male mold part having a smaller end and a large end, the latter being adjacent the core chamber 233. As may clearly be seen from FIG. 4 and FIG. 6, et seq., the core body 241 is hollow, the interior wall configuration being a true frusto-conical shape while the outer surface thereof changes to a true cylindrical form at area 242, adjacent the larger end. The core body also is provided with an annular mounting flange 243 adjacent its larger end, this flange bearing against the terminal lip of the core chest wall 235. Suitable flat headed counter-sunk machine bolts 245 pass through flange 243 at evenly spaced points around its circumference and are in threaded engagement with suitable apertures in wall 235 to thus firmly hold the core body 241 in abutment with the wall 235 of the core chest 215. Thus core body 241 and core chest 215 together form a sealed chamber into which steam or other fluids may be introduced under pressure.

It is also important to note that the tapered walls of the core body 241 are provided with circumferentially spaced elongated steam passages 247 which extend from the large end to the small end thereof. In communication with these passages 247 and extending to the outer surface of the core body are an equal number of very narrow slots 249. These slots, as may be seen in FIG. 4 and FIG. 6, extend completely along the frusto-conical portion of the outer surface of the core body and may also extend diametrically partially across the closed, small end thereof. The end of each of the passages 249 adjacent the large end of the core body 241 is tapped and threaded and each receives a valve seat 251 therein. These valve seats 251 are thus open to chamber 233 and passages 249 and since they are in threaded engagement in the ends of the passages 249, they may be adjusted, by rotation, in and out, so that the ends 253 which are flat, may be disposed in a common plane spaced from but paralleling the flange 243.

Disposed within chamber 233 of core chest 215 is an annular valve member 255. This valve member 255 is of a circumferential size sufficient to cover the valve seats 251 and, therefore, is provided with a planar face adapted to seat against the flat ends 253 of these seats. The valve member 255 (FIG. 7) is formed from a material which is relatively chemically inert and dimensionally stable and is mounted on a coaxial annular ring 257 which in turn is affixed by any suitable means to a series of three equally spaced bellows 259 (only two shown in FIG. 6, et seq.). These bellows 259 are in turn suitably mounted within chamber 233 and are in communication via passages 261 with the aforementioned annular part 219. Thus, when fluid pressure is admitted to port 219 via passage 223, the bellows 259 will be expanded to seat the valve member 259 firmly against the flat faces 253 of valve seats 251 to effectively block off passages 247 and slots 249 from chamber 233 and also the interior of the mold core body 241.

It will also be apparent from an inspection of FIG. 6, and also FIGS. 7 and 8, that the platen 23 is provided with an opening 24 through which passes a steam and water pipe 260. This pipe 260 extends through the core steam chest and into the chamber 233 where it is terminated in a diffuser 262 which extends into the hollow interior of the core body 241. A suitable nut 264 is threaded onto the exterior of pipe 260 to firmly position the pipe against the base of core chest 215 to assure that the diffuser 262 will remain centered in the interior of the core body 241.

It will be remembered that previously it was stated that the cylindrical wall 235 of the core chest 215 also included individual cylinders 239 spaced apart equally around the outside thereof. These small cylinders are in turn provided with pistons 265 which are stepped at 267 to form a land such that flange 243 of the core body will retain them in cylinders 239 yet a portion 269 of each may extend outwardly beyond the periphery of flange 243. Suitably fixed to the ends of the stepped portion 269 of the pistons 265 is an annular stripper ring 271, as by machine bolts 273, or the like. Thus as the pistons 265 move in cylinders 239 toward and away from platen 23, this ring 271 will be moved relative to the mold core member 241.

The inner periphery of the ring 271 may be formed of an anti-stick material, an example being again "Teflon" material, or it may be formed integrally with the body of the ring and provided with an anti-stick coating such as a silicon release agent on the surfaces which contact the molded article. If formed as an insert, the insert is press fitted into the ring proper, as illustrated in the drawings, namely insert 281. In any event, as clearly shown in FIG. 6, et seq., the cross-sectional configuration of this portion of the ring is such that its inner peripheral surface 277 is very slightly larger than the diameter of the annular portion 242 of the core 241. This surface is also undercut at 279 to define with the core an annular port extending completely around the circumference of the large end of the mold adjacent the mounting flange 243. A small aperture 282 extends through the mold wall and is in communication with 279 the aforesaid annular port and also port 247. The purpose of this arrangement will become apparent hereinafter.

It will also be noted, particularly in FIGS. 6, 7 and 8, that the annular edge of that portion of the insert 281 which extends toward the frusto-conical core area is also provided with a small groove 281' of generally trough-shaped configuration. The purpose of this groove will also be apparent hereinafter.

Referring only briefly for the moment, to FIG. 8, it will be noted that, in addition to the aforementioned steam pipe 260 which centers into the hollow interior 233 of the core chest 215, a further conduit 290 also passes through a suitable aperture 291 in platen 23 and into the threaded opening 293 in communication with the chamber 233. This line is a drain line and functions as will be hereinafter explained in full.

Having thus described the male core units 219 in detail, consideration will now be given to the structure and components making up the female mold part, herein referred to as the mold cavity 220.

Again as seen in FIG. 6, the stationary platen 21 is provided with a suitable aperture 301 in turn provided with an annular step or land 303 to which is fixed by bolts 305 an injector cone 310. The small end of the injector cone is in turn inserted within and bears against the end of generally bell-shaped housing 307 hereinafter referred to as the cavity chest. The cavity chest 307 is in turn fixed by suitable machine bolts 309 to the flat face of stationary platen 21 and is sealed thereagainst by means of a suitable gasket 312. It is provided further with a plurality of radially arranged ports 311, 313 and 315 in its skirt or sides, which ports receive, via typical threaded connections, an equal number of pipe coupling nipples, in turn, connected to steam and water lines 317 and 319 and a drain line 321.

The cavity chest 307 is closed at its mouth by means of the mold cavity proper 325. This member is generally frusto-conical in form having an inner surface configuration corresponding to that of the core 241 such that it can receive the core and define therewith a closed mold into which the partially foamed, i.e., prefoamed styrene may be introduced for expansion and fusion into the completed article. As seen in FIGS. 6 and 8, the open mouth of the mold cavity proper is provided with a series of stepped annular lands or grooves 327, 329 which are adapted to cooperate with the aforesaid stripper ring insert 281, and in particular with the groove 281' therein as will be described hereinafter in connection with the operation of the apparatus. The cavity proper includes a circumferential flange 330 at its open mouth, which flange 330 is fixed by means of machine bolts 331 and gasket 332 to the cavity chest so as to form therewith the female mold assembly 220 comprising a mold cavity surrounded by a closed steam chest. In this connection, it will be noted that the smaller end of the mold within the chamber is provided with a cup-shaped cap 333 which seats within a suitable recess 335 provided in the bell-shaped chest 307 and that a suitable O-ring seal 337 is provided to assure that leakage from the steam chest will be minimized. The cap 333 is affixed to the mold proper 325 by means of a hollow collar 339 such that steam introduced into the steam chest 340 will completely surround the mold walls and, in particular, flow across the small end thereof around the hollow collar 339.

For the purpose of securing even distribution of the steam and water into the cavity steam chest and also to prevent erosion of the relatively expensive mold parts due to continuous, localized exposure to a stream of steam or water, the ports 311 and 313 open into a pair of diffuser rings 341, 343, respectively. These diffuser rings are channel-shaped in cross section and form with the interior walls of the cavity steam chest 307 a pair of annular discharge nozzles due to the fact that each is provided with multiple discharge ports 345, 347 which direct steam and water showers into the chamber 340. It will be noted that these ports 345, 347 discharge steam toward the large end and small ends of the mold cavity proper to assure adequate steam distribution on the one hand and adequate water distribution on the other hand to enable proper heating and coating of the walls of the mold.

Figure 2:
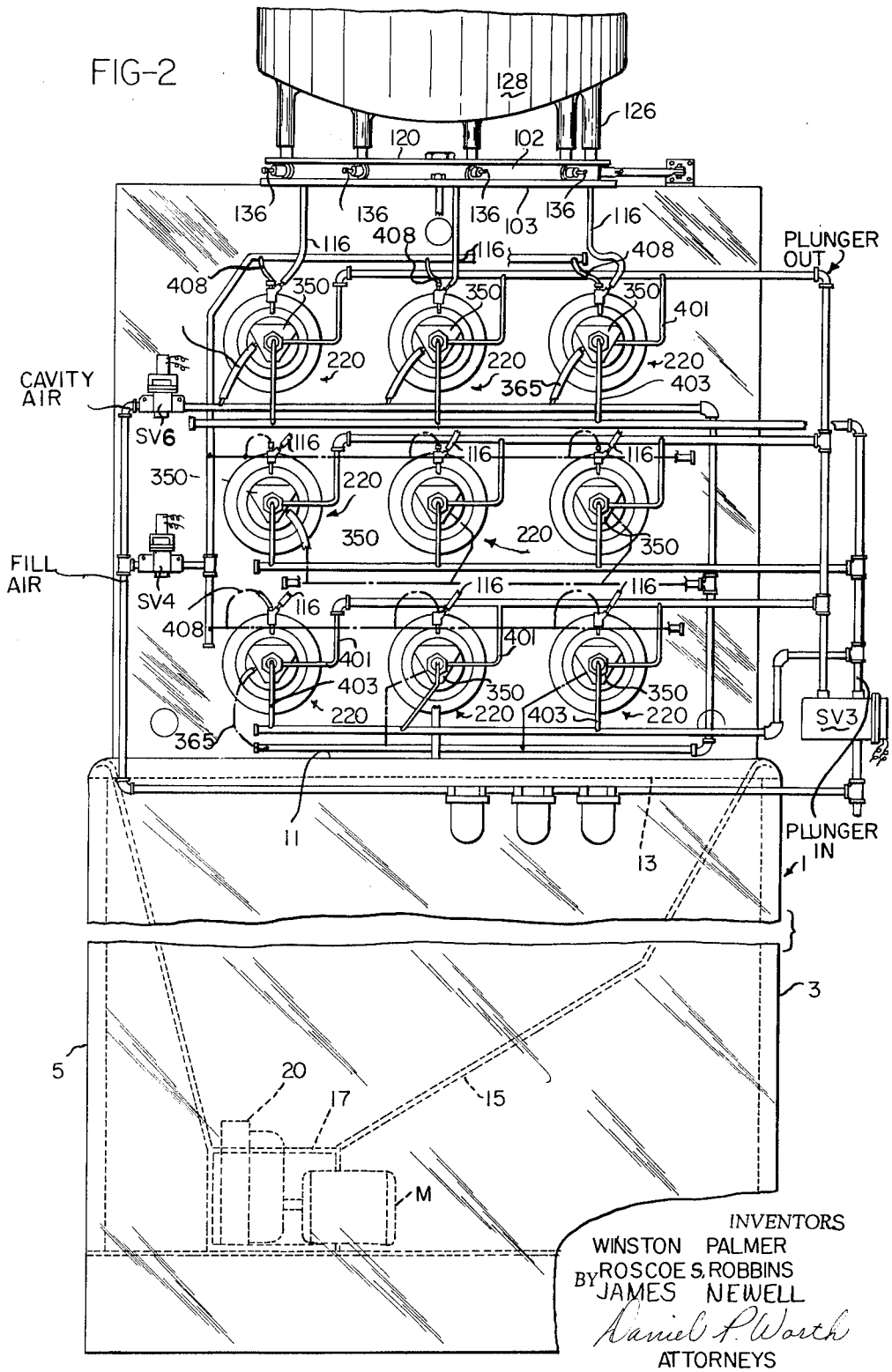
FIG. 2 is an end elevational view of the machine shown in FIG. 1, taken along the line 2—2 thereof.

Turning, now, to FIG. 1 and also FIGS. 2, 8 and 16, it will be seen that the injector cone 310 is provided with a longitudinal injection port 351 which is of a diameter equal to and is coterminous and concentric with the port 340 which passes through the collar 339 and opens into the mold cavity proper.

Suitably affixed to the flat planar face 353 of the injector cone 310 as by elongated hanger bolts 355 is a small pneumatic motor 350 which is connected by a key and slot connection 357 to the enlarged head 359 of a plunger 360. The plunger 360 is, in turn, provided with a further internal port 361 which is, by a suitable coupling 362, connected at the enlarged head 359 with an air line 365 such that air will pass through the plunger 360 into the mold cavity proper when it is supplied via an external source to line 365.

As shown in FIG. 8 and also FIG. 16, the injection port 351 is further in communication with an injector venturi 370 by a slanted loading passage 371 which is in communication with filler tube 116 and an air nozzle 373 so located with respect to passage 371 that air exhausted through nozzle 373 will create a venturi effect causing the material which has been metered down from metering valve 100 to be rapidly exhausted from the filler tube 116 and carried into the mold cavity proper. Control of the charge is effected by plunger 360 which will be moved via cylinder 350 back and forth in injector cone 310 to cover and uncover passage 371 at its union with injection port 351. It will be noted that passage 373 is so arranged as to discharge air generally in the center of the part 371 so as to assure even flow of the particulate material through this latter port.

Having now described in detail each and every structural component of the apparatus, consideration will now be given to the operative steps of the various components, it being understood that various control means may be utilized to effect either automatic, manual or semi-automatic operation as may prove desirable.

*Operation*

Initially, attention is invited to the fact that four sources of supply are required to operate the apparatus, namely, steam, water and air and electrical energy. Of these, the steam and water supplies are used to provide both heating and cooling of the mold parts, while air pressure is relied upon as the major source of energy to effect movement of the various functioning components, one with respect to the other, and, as well, to both fill the molding cavity with particulate material and to exhaust the finished, self-sustaining product from the apparatus. Electrical energy is used to actuate the various valve means used throughout the apparatus and to effect proper sequence of operations.

Figure 5:
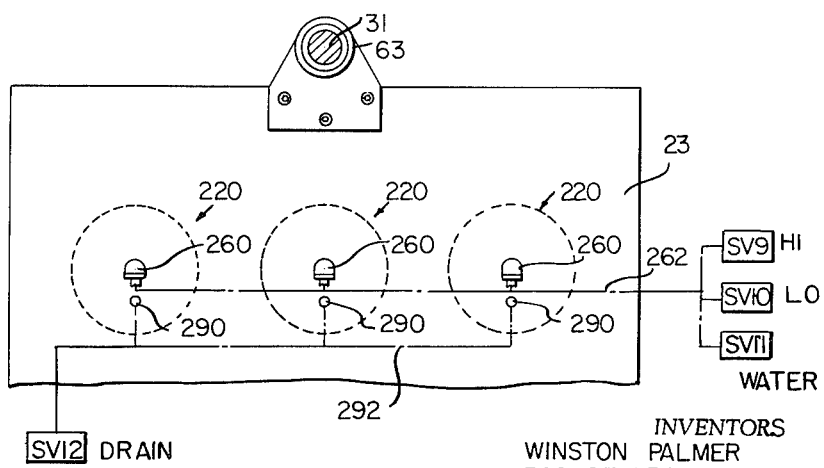
FIG. 5 is a rear elevation of the part shown in FIG. 1 and FIG. 4, taken along the line 5—5 of the former.

Considering, first, the steam supply, it will be seen from an inspection of FIGS. 3, 4 and 5, that steam lines 317, 319 and 260, respectively, for each of the mold parts comprising mold assemblies 200 are interconnected via suitable conduits 262, 324 to common sources of both steam and water, valves being interposed between each separate source and the common lines.

Drain lines 231 for the core parts of the mold are in communication via a common drain pipe 322 as are drain lines 321 for the cavity elements 220 via common line 292, these drain lines both being under the control of a suitable common valve.

A single source of air pressure supplies all of the various air-operated parts including closing and toggle cylinders 70 and 85 via air lines 72a, 72b and 86, 88, respectively; the metering valve cylinder 132 via air lines 126, 128; the stripper ring pistons 265 via ports 217 and conduits 226; the annular core valve 255 via conduits 258; and the filling plungers 360 via conduits 401, 403, respectively. In addition, the same source of air pressure also becomes the medium of conveyance for the particulate material into the molding cavity via conduits 408 and for assisting in removal of the article from the mold, after completion, via ports 361, lines 365 and ports 229 via lines 231, all as will be described.

Turning, now, to FIG. 1 in association with FIGS. 17a and b, and FIG. 18, it will be seen that for the purposes of illustration the machine components have been schematically broken down in FIGS. 17a and b, while in FIG. 18 the control circuit is shown as a ladder diagram for purposes of illustration of at least one form of automatic control means. It is to be understood that a description of the action of one of the mold units 200 and its respective core and cavity or male and female parts 210, 220 serves to adequately define the action of any number of such mold units since all act simultaneously.

Initially, the various energy sources are energized by their own controls and the normal de-energized position of the various valves SV1 through SV12 is as shown in FIGS. 17a and b. Thus valves SV5 controlling the core valve 257 and drain valve SV12 are the only valves open aside from valves SV7 and SV8 which are biased so as to merely pressurize the rod ends of both cylinders 132 and 70, producing no movement of the platen 23 or the metering valve assembly 100.

Reference to FIG. 18 will show that the control circuitry includes five timer controls which may be set to provide for various periods of energization or de-energization of any one of a number of electrically responsive means under their respective control. The designation TC identifies such controls and the sequence of switches and/or relays controlled by any given timer device also follows the designation TCS . . . . The timer controls per se are standard equipment available on the open market for use in broad and varied application. One example of control which will satisfy the requirements of the invention are Atcontrol timers manufactured and sold by Automatic Timing and Controls, Inc., of King of Prussia, Pennsylvania.

With the steam water and air sources energized and the position of the valves as shown in FIGURES 17a and b, closing of the start contacts by start button S, immediately moves valves SV1 (stripper), SV2 (blow-off) and SV8 (high pressure steam) to the open position via switches 502 (blowoff) and timer controls TC1 (stripper) and TC2 (steam sequence). In this condition of operation since valve SV5 is open, the core valve 255 is firmly seated against ports 251 to prevent any moisture from entering the forming cavity or wetting the male mold due to seepage. The stripper cylinders 239 are pressurized to raise the stripper ring 271 into its extended position as valve SV1 moves to open position. At the same time, due to the proximity of the movable platen to a limit or proximity switch 501, blowoff air passes through the opened valve SV2 and passes through line 231, port 229, port 282 and then exhausts through slots 249. Switch TC2S1 also closes to energize valve SV9 and admit steam via lines 260, 262 and 317, 319 and 324 into the male and female mold steam chests. Since drain valve SV12 is open, the high pressure steam, usually at one hundred pounds per square inch will begin to purge the lines and chambers of any residual water or moisture left from the preceding cycle or from condensation and also begins to preheat the mold parts.

The time delay relay R1 holds switch R1S open for a few moments to allow any material on the mold parts to be blown clear of the apparatus, after which it closes energizing valve SV7 to start the movable platen to a closed position. As the platen moves, it clears proximity or limit switches 501 and 502. Switch 501 is inactive at this point, and as switch 502 is cleared, valve SV2 closes, shutting off the blowoff air.

As the platen 23 reaches a position which represents the end of the stroke of cylinder 70, it will trip a magnetic proximity or limit switch 504. As this switch closes it will immediately start timer control TC5 which closes switches TC5S1 and TC5S2 which causes valves SV3 and SV4 to move to their open positions wherein the metering valve cylinder 132 moves from its load receiving position to its load discharge position in communication with ports 112 and filler tubes 116. A metered supply of raw material is thus placed in communication with the cavity. It will be noted that when the cavity parts are in the semi-closed position so as to close switch 504, the mating surfaces of the stripper ring 271 and the cavity element are in abutment whereby seal ring insert 277 is in sealing engagement with the cavity but because of the space between the stripper insert 277 and the annular portion 242 of the core part, a circumferential exhaust port is defined adjacent the large end of the mold. Thus, as timer TC5 operates, valves SV3 and SV4 will first pressurize venturi port 373, secondly, energize the rod end of cylinder 350, thus withdrawing plunger 360. The result is that a suction is created in filling tubes 116 while pressure is created in the sealed, but still partially open, molding cavity defined between the core element and cavity element 210, 220. New material is thus sucked into and blown into the cavity, to be trapped therein, while the air vents through the peripheral outlet between the stripper ring insert 271 and the annular portion 242 of the core body.

After a preselected period, timer control TC5 de-energizes with the result that valves SV3 and SV4 shift back to the position shown in FIG. 17a and the plunger 360 blocks filling port 371; air pressure through the venturi block is cut off; and the metering valve cylinder 132 is energized at its rod end to return to its filling position relative to the filling plate.

After the filling cycle is complete and concurrently with the cycling out of timer control TC5, the timer control TC1 also cycles out to open switch TC1S1 and TC1S2. The stripper ring valve SV1 is moved to vent position while the platen-locking valve SV8b is moved to open position. With the stripper cylinders 239 now exhausting and the head end of cylinder 85 pressurized, the platen closes to lock the mold parts in fully closed position as shown clearly in FIG. 8.

At approximately the same time as fill timer TC5 cycles out, the steam injection sequence timer TC2 cycles out. As it does, due to its electrical interlock with steam injection timer TC3, this timer is energized. Simultaneously, switch TC2S1 is opened to close high pressure steam valve SV9.

A brief interval, about one second, follows during which the steam pressure drops due to the cutoff of valve SV9 and the fact that drain valve SV12 is open. At this point, timer control TC3 closes switch TC3S1 and TC3S2 and opens switch TC3S3. Drain valve SV12 is closed; core valve control valve SV5 moves to a vent position exhausting the bellows 259 to atmospheric pressure and steam valve SV10 opens allowing low pressure steam through regulator R to fill the steam chests 233 and 340. As steam pressure builds up in the chest 233, core valve 255 is opened as the pressure collapses bellows 259 and steam is injected directly into the molding cavity defined between the mold parts 210 and 220 via ports 282 and passages 253 in valve seats 251 and slots 249. Thus the bead material is caused to expand and become welded together to form the self-sustaining molded object. After a predetermined period which may vary according to the conditions of raw material, the thickness of the objects being molded, steam pressure, etc., and for which timer control TC3, like controls TC1–5, may be adjusted, timer control TC3 de-energizes and switches TCS1–S3 open, the core valve control valve SV5 opens, reseating core valve 255, drain valve SV12 opens and steam valve SV10 closes.

At this point, water control timer TC4 energizes due to its interlock with timer control TC3 and water valve SV11 opens to admit cooling water into the steam chest 233 by diffuser 252 and steam chest 340 via lines 317, 319 through diffuser rings 341, 343. After a predetermined period, the timer control TC4 cycles out and in so doing opens switches TC4S1 closing water valve SV11; TC4S2 which energizes platen unlock valve SV8a, to unlock the platen-locking mechanism, TC4S3 which breaks the circuit to relay R1 such that the platen open-close cylinder 85 is pressurized at its rod end by movement of valve SV7, and switch TC4S4 which energizes valve SV6 to initiate air flow into the mold cavity element 220 via ports 361 in plunger 360 and lines 365 to assure the molded object will be ejected from the cavity and carried on the mold part 210 until the platen 23 has opened.

As the platen 23 moves away from platen 21, it will trip fill switch 504 to its open position again and also trip switch 503 which will open breaking the control circuit to valves SV6 and SV8a via switches 503S1 and 503S2 whereby the cavity air is shut off and the platen unlock cylinder 8a whereupon this cylinder is no longer energized and, hence, the platen open-close motor 70 continues to open the platen.

Movement of the platen 23 continues until it reaches a slightly less than wide open position where it trips proximity or limit switch 502. This switch closes the circuit to blowoff valve SV2 and air is directed through line 231 to part 282 and thence to slots 249 (FIG. 6) to blow the article free of the male mold member 210. Since the stripper ring is still seated, no air can leak between the parts 243 and the ring.

Further movement of the platen 23, usually about six inches from the point of contact with switch 502, to its fully open position results in the tripping of switch 501, which is in parallel with start switch S, and initiates recycling of the machine as it closes the circuit to relay 1 momentarily whereupon relay R1 is energized, switch 502 being closed, blowoff valve SV2 is open and timer controls TC1 and TC2 again are energized.

It will be seen, therefore, that the apparatus is fully capable of completely automatic operation and that means are provided whereby the various cycles, steam, water and filling may be adjusted to meet varying conditions of service.

Turning, now, to FIGS. 19, 20 and 21, various modifications are illustrated which, while not specifically affecting the basic operating principles of the apparatus, will enhance the construction and service life thereof and further which may enhance the efficiency and utility of the machine for specific applications.

One example of such a change is apparent with respect to FIGS. 2-5 wherein the external piping could well be incorporated into a manifold structure comprised of a series of plates sandwiched together wherein each plate may be routed by a suitable machining process to contain the various ports, as illustrated in FIG. 19. The manifold will be mounted by suitable brackets on platen 21 and thus will eliminate many joints and connections which might be subject to vibration and leakage and would comprise cover plates A and B and plates 601, 603 having ports 401, 403 and 365 and 408 routed in the one surface of each thereof whereby as the plates are sandwiched together, the passages are sealed to the atmosphere and one with respect to the other. Obviously, this arrangement can be applied also to the steam and water lines and, as well, drain lines 317, 319 and 321, FIG. 3, for the platen 21 as well. Similarly, platen 23 could carry a similar manifold arrangement mounted thereon and movable therewith and embracing lines 258, 271, 260 and 290, respectively.

In FIGS. 20 and 21, further modifications are illustrated. In this case, the platen 21 would be provided with a common steam chest for all of the mold units 220. The chest would be fabricated of a flat back plate 620 and a similar front plate 622 joined together at their margins by a series of side plates 624. Preferably, plate 620 is bolted or otherwise removably fastened to the side plates 624 as by bolts 626 and suitable sealing means 627 is provided at the joint. Back plate 622 is likewise removably affixed to the face of platen 21 by bolts 629.

The back plate 620 is provided with suitable apertures 631 to receive the narrow cylindrical extension 339 of the mold element 325. The filler cone 310 is mounted on platen 21 in the same manner as in the case of FIG. 6 and is unmodified. Since the part 333 in FIG. 6 is eliminated, the cone meets the extension 339 and plunger 360 operates in identically the same fashion as previously described. As also is clearly shown, the front plate 620 is also provided with apertures which receive mold elements 325 bolted thereto by bolts 331, also as previously described in connection with FIG. 6.

The lowermost wall of the chest is apertured and receives a manifold arrangement of drain pipes 315' all emptying into the drain pipe 321 which is controlled by valve SV12, as has been described.

Steam and water line 319 is eliminated. Instead, steam-water line 317 is split into three separate branches 317a, b and c. These branches are fixed to the back plate 620 by suitable brackets 637 as by bolts 639 or the like. The branch lines 317a, b and c are provided with cross conduits 641 which, in turn, carry diffusers 341, 343 which are positioned with respect to the mold element 325 precisely in the same location as they are located in the structure shown in FIG. 6. In FIG. 20, the diffuser ring arrangement is clearly illustrated.

Thus, the number of lines is reduced and the mold structure is capable of operation precisely as described, the steam and water being directed against the sides of the molding surface for rapid heating and cooling, the condensed moisture and/or cooling water filling the bottom of the steam chest and passing out through drain valve SV12 in precisely the same manner as previously described.

Referring, now, to FIG. 22, an alternative construction of the core or male mold structure is illustrated. In this embodiment, the steam chest 233a is modified interiorly to comprise two separate and discrete chambers as distinguished from the single chamber structure 233, as shown in FIG. 6. Also, bellows 259 and core valve 255 are deleted as are valve seats 251. The remaining mold parts remain unchanged, like reference numerals indicating like parts as between FIGS. 6 and 22. Thus chamber 233a where it extends into the interior of cup-shaped steam chest 235 is of smaller diameter than chamber 233 and is surrounded by an annular wall 651 and an annular chamber 653. The annular wall 651 abuts against the bottom of wall 241 and thus blocks the ports 247a from chamber 233a. The annular wall, however, is provided with ports 655 which place the two chambers in communication with one another and, thus, chamber 233a is, via these ports 655, in communication with the passages 247 and slots 249 in the mold surface.

Overlying said parts 655, however, is a valve member 657 which seats against the outside of annular wall 651 and is disposed within chamber 653. The valve is actuated via a valve stem 659 attached to bellows 661 which, in turn, is in communication with line 258 controlled by valve SV1, as previously described.

From the foregoing description of the apparatus and its operations, it will be apparent that modifications and changes thereto will occur to those skilled in the art, which modifications and changes are within the spirit and scope of the invention which is limited solely as defined in the claims.

We claim:

1. An apparatus for molding foamable thermoplastic beads into unitary objects comprising at least a pair of complementary mold parts movable from an open to a closed position to define a molding cavity therebetween, means in communication with one of said mold parts to fill the molding cavity so defined with foamable plastic beads when said parts are in cooperating cavity-defining relationship, chamber means intimately associated with said mold parts, means in communication with said chamber means to introduce heating and cooling fluids sequentially therein, at least one of said mold parts being ported to place said chamber means in communication with said molding cavity, and valve means in said chamber means and acting between said chamber means and ported mold part to selectively open and close the ports therein, said ported mold part comprising the male mold member having said ports defined in the mold wall and opening into elongated slots adjacent the molding surface of said mold part and terminating in valve seats at the base of the mold opening into said chamber means, and said valve comprising an annular ring bearing against said seats, operator means for said valve, said operator means for said valve being disposed within said chamber.

2. An apparatus as defined in claim 1, wherein said ported mold part comprises the male mold member having said ports defined in the mold wall and opening into elongated slots adjacent the molding surface of said mold part and terminating in openings at the base of the mold adjacent to, but spaced from, said chamber means, an annular passage in communication with said chamber and said ports, valve means between said passage and said chamber, operator means for said valve, said operator means being disposed exteriorly of the mold parts and said chamber.

3. An apparatus as defined in claim 1, wherein said mold parts are of complementary frusto-conical form and define a cup-shaped molding cavity therebetween.

4. A molding apparatus for molding foamable thermoplastic particulate material into unitary objects comprising a base, a fixed and a movable platen mounted on said base, means for moving said movable platen toward and away from said fixed platen comprising a first fluid motor connected to said base and said platen, at least one of said connections being a lost-motion connection whereby said first-mentioned fluid motor moves said movable platen to a position closely adjacent to said fixed platen; further fluid motor means mounted on said base, a toggle linkage connected between said further motor means, said base and said movable platen such that actuation of said further motor means moves said platen to a finally closed and locked position with respect to said stationary platen, a plurality of complementary mold parts mounted on said platens including, further, pneumatic means for filling each of said units prior to actuation of said last-mentioned fluid motor means; retractable means carried by each of said mold parts for sealing said mold parts one to the other upon termination of the platen motion imparted by said first-mentioned fluid motor means and prior to movement of said platen to final locked position by said further fluid motor means.

5. A molding machine as defined in claim 4, wherein each molding unit of said complementary mold units comprises a cavity element and a core element of complementary shape for defining a molding cavity therebetween, said mold sealing means comprising an annular ring surrounding said core element, said ring and said insert being movable toward and bearing against the face of the cavity element for sealing engagement of said ring with the open periphery of the latter element.

6. A molding machine as defined in claim 5, wherein the said ring for each of said male mold units is moved by a plurality of piston and cylinder fluid motor means disposed equidistantly around said ring, the aggregate area of the pistons associated with the mold parts exceeding the piston area of said first-mentioned fluid motor means, but being less than the aggregate combined areas of both said first-mentioned and said further fluid motor means.

7. In an apparatus for molding particulate thermoplastic material into a unitary molded structure by expansion of said particulate material, a first mold part, a second mold part co-operable with said first mold part to define therewith a molding cavity; means for moving said second mold part toward and away from said first mold part, said means acting to interrupt the movement of said first mold part in an intermediate position prior to closing to a final position, filling means connected with said first-mentioned mold part, said filling means comprising a metering valve and a source of pneumatic pressure for conveying particulate material from said metering valve into said cavity during the period of interrupted motion thereof and before the mold parts close into final molding cavity-defining association, said second-mentioned mold part including means for sealing the mold parts, one to the other, when said filling means is exhausting into said molding cavity, said last-mentioned means permitting the exhaust of filling pressure to the atmosphere during said filling and being retractable against the second-mentioned mold part to permit final movement of said mold parts by moving means into final locked molding cavity-defining relation, said sealing means being extensible, upon actuation of said moving means, to move said mold part to an open position to assist removal of the articles molded from the open mold parts.

8. An apparatus as defined in claim 7, including heating and cooling means intimately associated with each of said mold parts.

9. An apparatus as defined in claim 7, wherein said mold parts comprise a core element and a cavity element and said heating and cooling means comprises a chamber surrounding said cavity element; said core element being hollow and in communication with a further chamber, each of said chambers being in communication with a heat source.

10. A molding machine as defined in claim 9, wherein said core element includes ports in communication with said chamber and discharging outwardly thereof into the molding cavity defined between said core and said cavity elements when said mold parts are in molding cavity-defining relationship and means disposed within said chamber and engageable with said core element to selectively place said molding cavity in communication with said heat source.

11. A molding machine as defined in claim 9 wherein said heat source comprises a source of steam.

12. In a molding apparatus for molding particulate thermo-responsive expansible material into self-sustaining objects, a pair of complementary mold parts movable into open and closed position, one of said mold parts comprising a cavity element and the other a core element, means for moving one of said mold parts relative to the other, said cavity element including a valved port, a source of particulate material and a source of fluid pressure in communication with said cavity element; said core element including a sealing member at its base and movable into engagement with said cavity to create a closed chamber therewith when said mold parts are disposed in closely adjacent but slightly spaced relationship one with respect to the other; said sealing means, when in engagement with said cavity element, being spaced from said core element a distance equal to the spacing between mold parts such that particulate material conveyed through said valved port by fluid pressure from said source will be entrapped within the molding cavity defined between said core and said cavity elements while said source is placed in communication with the atmosphere through the space between said sealing means and said core element, said mold parts being frusto-conical in shape and said sealing means comprising a ring surrounding the base of the core element and movable with respect thereto and engageable with the periphery of the open end of the cavity element.

13. A molding apparatus as defined in claim 12, wherein said cavity element is surrounded by and mounted upon a cavity chest defining therewith a heating and cooling chamber for heating and cooling the walls of the cavity and said core part is hollow and mounted upon and in communication with a cavity chest defining therewith a heating and cooling chamber.

14. A molding apparatus as defined in claim 13, wherein said core element is provided with ports in communication with said heating and cooling chamber and valve means are disposed within said chamber overlying said ports to selectively open and close said ports.

15. An apparatus as defined in claim 14, wherein said core element is provided with an annular flange mounted upon said core chest and said ports terminate in said core element in elongated slots spaced at equal intervals around the periphery of the core element and opening outwardly toward the mold core surface.

16. An apparatus for molding foamable thermoplastic beads into unitary objects comprising at least a pair of complementary mold parts, including cavity and core elements defining between them a generally frusto-conical cup-shaped molding cavity and being movable from an open to a closed position, means in communication with one of said mold parts to fill the cup-shaped molding cavity so defined with foamable plastic beads when said parts are in cooperating cavity-defining relationship, a chamber intimately associated with said mold parts, means in communication with said chamber to introduce heating steam and cooling fluids sequentially therein, at least one of said mold parts being ported to place said chamber in communication with said cup-shaped molding cavity, and a valve in said chamber and acting between said chamber and ported mold part to open the ports when the chamber is being supplied with steam, the ports communicating with substantially the entire 360° peripheral extent of the large end of the cup-shaped cavity so that steam will be injected into substantially the entire periphery of what will become the rim of the cup.

17. An apparatus as defined in claim 16 wherein said ported mold part comprises the core element having said ports defined in the mold wall and opening into elongated slots adjacent the molding surface thereof and terminating in valve seats at the base of the mold opening into said chamber, and said valve comprising an annu-

17 lar ring bearing against said seats, operator means for said valve disposed within said chamber.

18. An apparatus for molding foamable thermoplastic beads into unitary objects comprising at least a pair of complementary mold parts, including cavity and core elements defining between them a generally frusto-conical cup-shaped molding cavity and being movable from an open to a closed position, means in communication with one of said mold parts to fill the cup-shaped molding cavity so defined with foamable plastic beads when said parts are in cooperating cavity defining relationship, generally equally circumferentially spaced axially extended elongated slots in the molding surface of at least one of the mold parts, and means for supplying steam to the slots during molding so that the steam will intimately mix with the foamable beads in the molding cavity.

19. The structure of claim 18 further characterized by and including means for supplying steam to substantially the entire 360° peripheral extent of the large end of the cup-shaped cavity.

18

References Cited by the Examiner

UNITED STATES PATENTS

| 357,639 | 2/1887 | Snow | 18—6 |
|---|---|---|---|
| 2,828,509 | 4/1958 | Smucker et al. | 18—30 |
| 2,951,260 | 9/1960 | Harrison et al. | 18—5 |
| 3,118,176 | 1/1964 | Freedman et al. | 18—5 |
| 3,125,780 | 3/1964 | Harrison et al. | 18—5 |
| 3,139,466 | 6/1964 | Coughman | 18—5 XR |
| 3,156,015 | 11/1964 | Harrison | 18—5 XR |

OTHER REFERENCES

Plastics Engineering (pages 107–112), February 1961.

Koppers Dylite Manual Ch. 3e, pages 1–8, Nov. 15, 1959.

J. SPENCER OVERHOLSER, *Primary Examiner.*

WILLIAM J. STEPHENSON, MICHAEL V. BRINDISI,
*Examiners.*

W. L. McBAY, *Assistant Examiner.*